US005317299A

United States Patent [19]

Dhyanchand et al.

[11] Patent Number: 5,317,299

[45] Date of Patent: May 31, 1994

[54] ELECTROMAGNETIC TRANSFORMER

[75] Inventors: P. John Dhyanchand; Jayant Vaidya; Rajhunath Mokadam; Richard Arbanella, all of Rockford, Ill.

[73] Assignee: Sundstrand Corporation, Rockford, Ill.

[21] Appl. No.: 725,487

[22] Filed: Jul. 3, 1991

[51] Int. Cl.[5] .......................... H01F 33/00; H02J 3/00

[52] U.S. Cl. ....................................... 336/5; 323/361; 307/13; 307/16

[58] Field of Search .................... 336/5; 363/153, 154; 323/361, 358-359; 307/13, 16

[56] References Cited

U.S. PATENT DOCUMENTS 3,711,762 1/1973 Eckenfelder et al. .................. 336/5

*Primary Examiner*—Leo P. Picard
*Assistant Examiner*—Bot Ledynh
*Attorney, Agent, or Firm*—Marshall, O'Toole, Gerstein, Murray & Bicknell

[57] ABSTRACT

A summing transformer having a core structure, first primary and secondary windings wound on the core structure for establishing a rotating electromagnetic field when the first primary winding is energized, and second primary and secondary windings wound on the core structure for establishing a rotating electromagnetic field when the second primary winding is energized, and wherein the second first and second secondary windings are connected together so that voltages induced therein are added.

21 Claims, 7 Drawing Sheets

ELECTROMAGNETIC TRANSFORMER

BACKGROUND OF THE INVENTION

The present invention relates to electromagnetic transformers.

Electromagnetic transformers have been used in a wide variety of applications. Such applications, for example, include either stepping up or stepping down voltages and/or currents, for isolating high-voltage circuits from low-voltage circuits, for isolating circuits operating at one frequency from circuits operating at a different frequency, or for combining signals in any particularly-desired fashion. Normally, such transformers have an air core or they have a ferromagnetic core if it is desired to provide a high permeability path for the flux which passes through the windings of the transformer associated with such core. A ferromagnetic core provides a high degree of magnetic coupling between the windings and supports a larger amount of flux than is possible in an air core.

Multiple transformers can often be used to accomplish together what would otherwise be done by a single transformer such as when the amount of power to be handled by the transformer is so large that it is either impossible or impractical to use a single transformer. Another application for multiple winding transformers is in three-phase power systems. A three-phase power system typically produces three sinusoidal voltage sources where the voltages are equal in magnitude and frequency, but separated by predetermined phase shifts. The advantages of multiphase power systems include both more efficient conversion of electromechanical energy and savings in the transmission of the three-phase energy. Although early multiphase systems were for the most part two-phase, three-phase systems are the most commonly used multiphase system currently.

Because a three-phase transformer offers more efficient use of core materials as compared to three single-phase transformers which handles the same amount of apparent power, three-phase power systems typical]y rely upon single three-phase transformers. There are several possible known ways of combining cores of three transformers in order to obtain a single three-phase transformer. For example, a core-type three-phase transformer is essentially three single-phase core-type transformers whose magnetic circuits are wye connected. A core-type three-phase transformer typically has three columns of electromagnetic material with their ends joined by two corresponding rows of electromagnetic material. Each column carries a primary winding and a secondary winding for a respective phase of the three-phase system. A shell-type transformer, on the other hand, consists of a rectangularly-shaped electromagnetic core having three sets of holes, two holes for each set, distributed along the length of the core. Primary and secondary windings for each phase of the three-phase transformer are wound around the corresponding legs formed by the sets of holes. This transformer also offers some savings in core material. There are, of course, other types of core structures known in the art.

Also, three-phase transformers often rely principally upon a stationary, although oscillating, field for the transformation of voltage and transfer of energy. However, there have been known induction transformers which rely upon rotating fields for such transformation of voltage and transfer of energy.

Furthermore, it has been known to use three-phase transformers for the summation of voltages produced by multiple voltage sources. However, these summing transformer designs have relied upon stationary fields for the transformation of voltage and transfer of energy. These designs do not make efficient use of core iron and winding copper and, as a result, performance optimization is limited. Also, inefficient use of the core iron and winding copper causes an increase in bulk and/or weight with a resulting decrease in transformer efficiency.

SUMMARY OF THE INVENTION

The present invention improves on existing known transformers by providing a rotating field summing transformer having a first core with primary and secondary windings wound therearound so as to produce a rotating field when the primary winding of the first core is energized and a second core with primary and secondary windings wound therearound to establish a rotating field when the primary winding of the second core is energized such that the secondary windings of the two cores are connected together to sum the voltages induced across these two secondaries.

In another aspect of the invention, a second core is disposed within the inner perimeter of a first core and primary and secondary windings are provided within slots disposed along the interface between the two cores.

These designs allow for more efficient use of iron and copper, for improved cooling due to the distribution of the copper, and for less acoustic noise.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
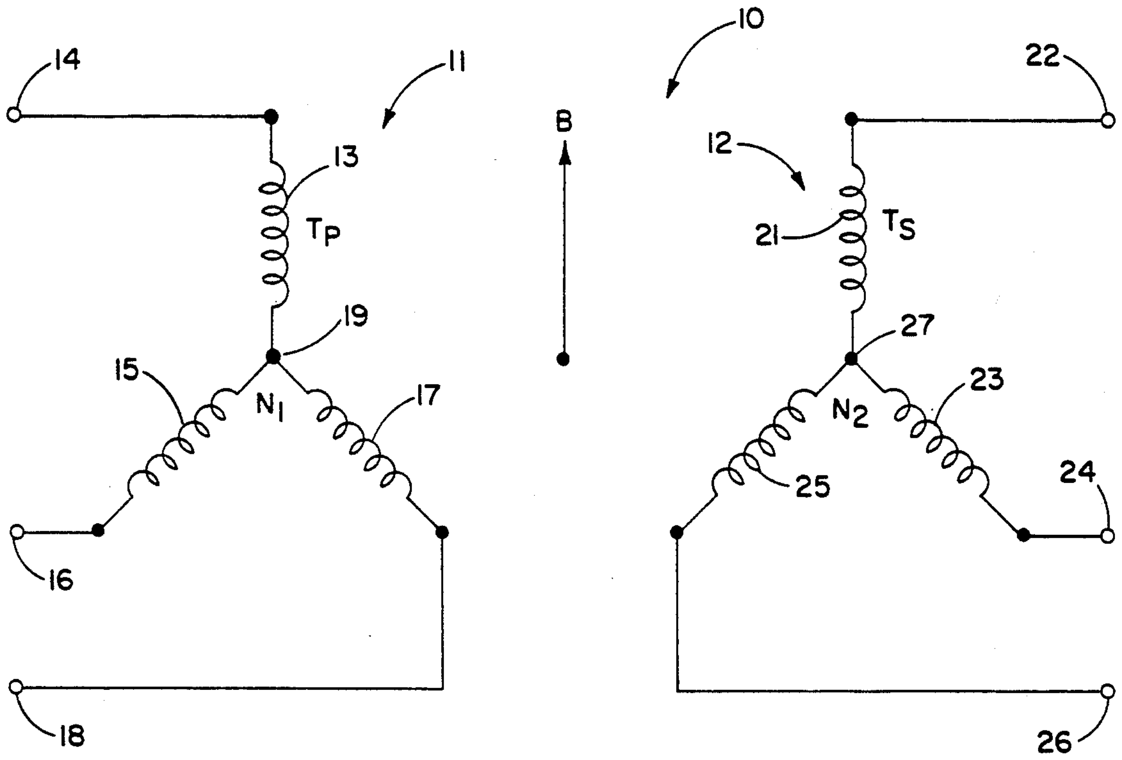
FIG. 1 is a schematic diagram showing the primary and secondary windings of one transformer making up the summing transformer according to the present invention.

Three-phase transformer 10 is shown in FIG. 1 comprising primary 11 and secondary 12. Primary 11 includes first winding 13 having one end connected to terminal 14 for receiving the first phase of a three-phase voltage source, second winding 15 having one end connected to terminal 16 for receiving the second phase of the three-phase voltage source, and third winding 17 having one end connected to terminal 18 for receiving the third phase from the three-phase voltage source. The other ends of each of the windings 13, 15, and 17 are connected together to form neutral point 19. As shown in FIG. 1, the windings 13, 15, and 17 of primary 11 are wye connected, although these windings could alternatively be delta connected.

Secondary 12 includes winding 21 having one end connected to terminal 22 for supplying one phase of the induced three-phase transformer output voltage, second winding 23 having one end connected to terminal 24 for supplying a second phase of the induced three-phase transformer output voltage, and third winding 25 having one end connected to terminal 26 for supplying the third phase of the induced three-phase transformer output voltage. The other ends of windings 21, 23, and 25 are connected together to form neutral point 27. By correctly winding the windings 13, 15, 17, 21, 23, and 24 on the electromagnetic core structure and by supplying primary windings 13, 15, and 17 with three voltages, each separated in phase by 120°, a rotating field can be established for inducing three-phase voltages in secondary 12.

Figure 2A:
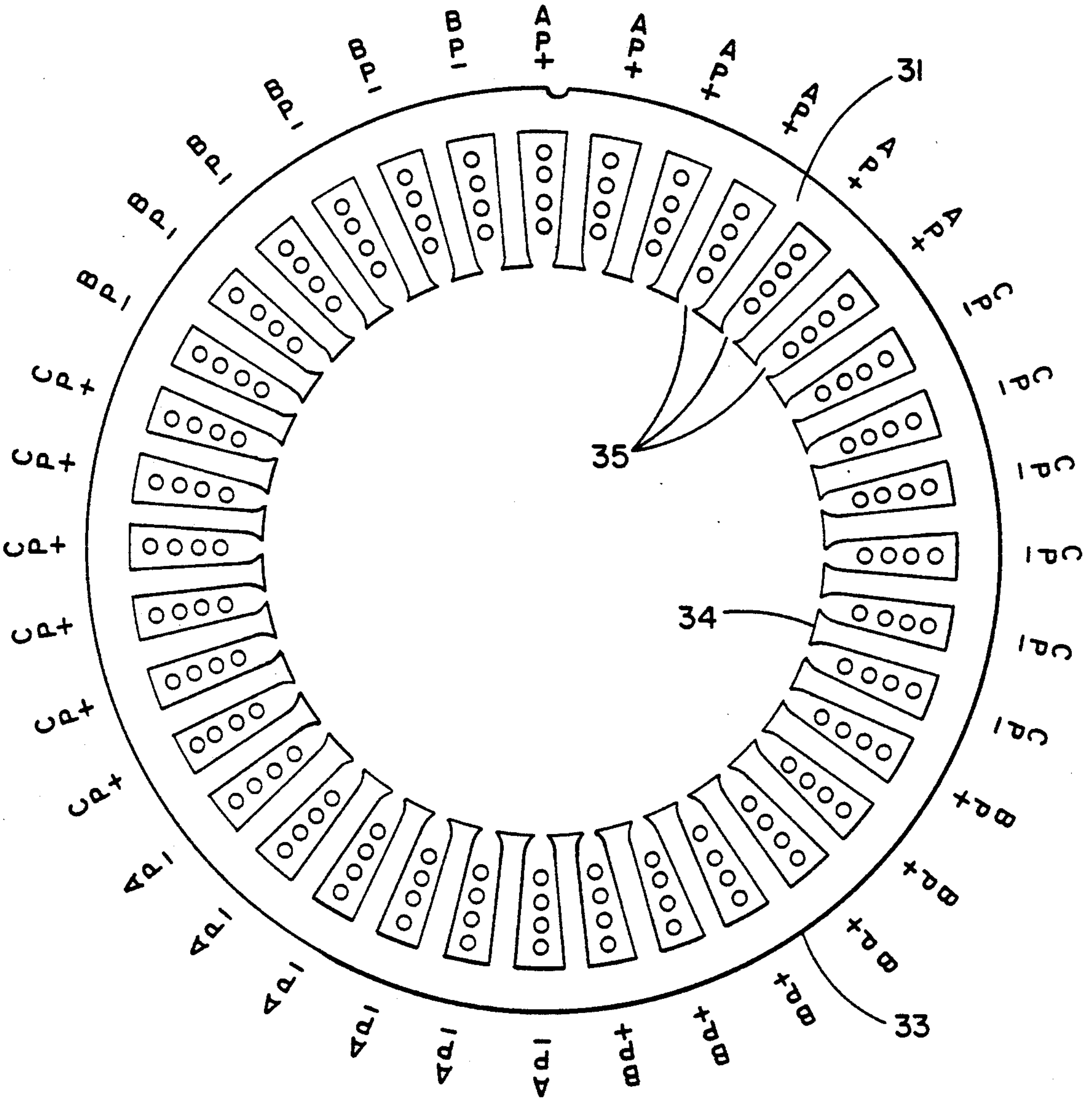
FIG. 2A shows an outer electromagnetic core having three primary phase windings wound thereon.
Figure 2B:
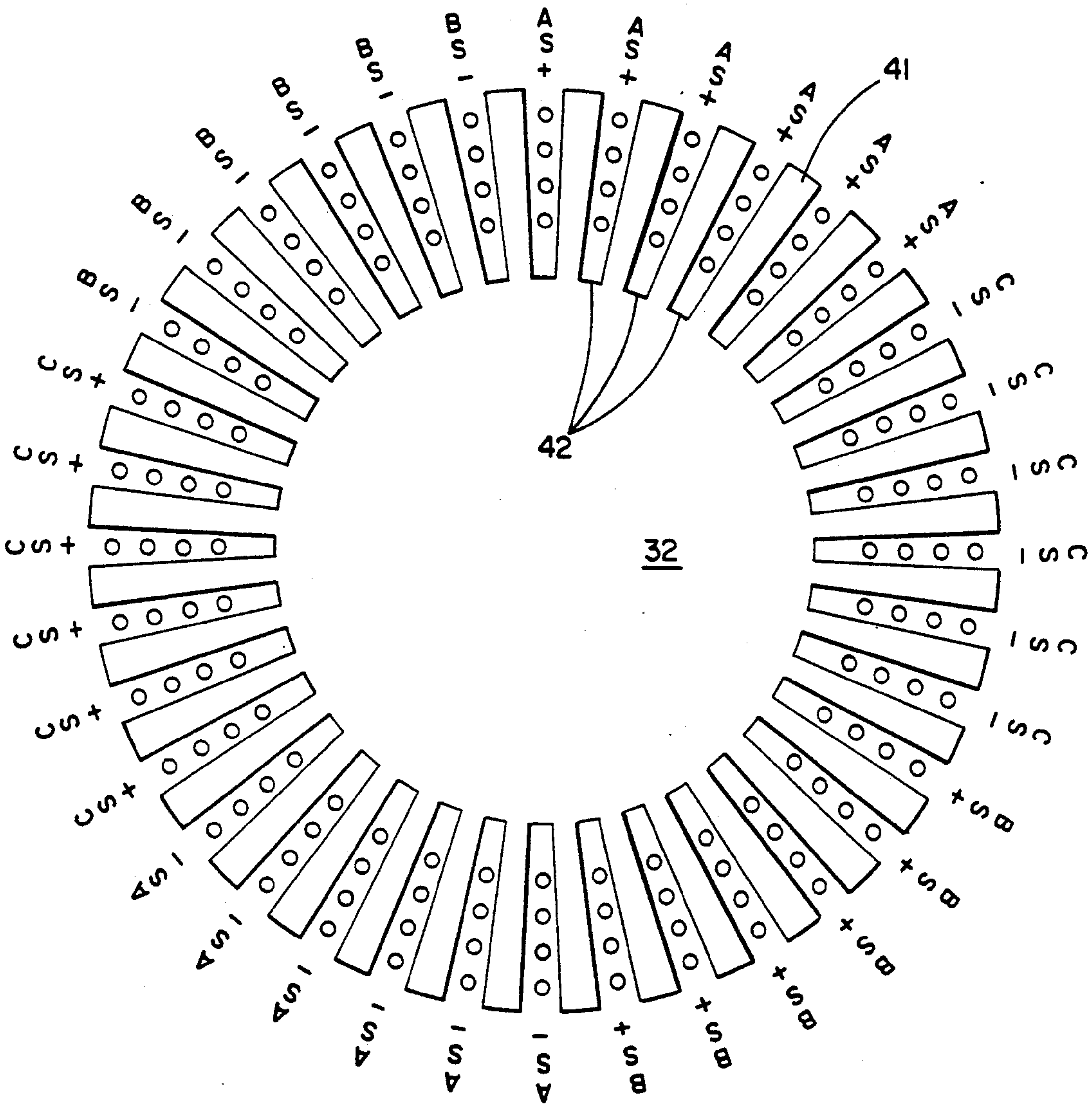
FIG. 2B shows an inner core for use in association with the core shown in FIG. 2A and having three secondary phase windings wound thereon.

FIGS. 2A and 2B show one winding arrangement for winding primary 11 and secondary 12 in a manner to establish a rotating field. The electromagnetic core of transformer 10 comprises first core 31 shown in FIG. 2A and second core 32 shown in FIG. 2B. Core 31 has an outer periphery or circumference 33 and an inner periphery or circumference 34. Slots 35 are disposed around inner periphery 34 of core 31 and receive the windings of primary 11 as shown. One or more turns of windings can be wound in oppositely displaced slots having the polarities shown for explanation purposes only. If 36 slots are used as shown in FIG. 2A, each phase requires 6 adjacent slots disposed opposite 6 additional adjacent slots for a total of 12 slots. Wire is wound from a first (positive polarity) end thereof in the first and oppositely disposed AP+ slot to the opposite AP− slot and back for a predetermined number of turns and then wound in the next adjacent and oppositely disposed AP+ and AP− slots and so on until all 6 of the oppositely disposed sets of AP+ and AP− slots have been wound. The second end of the wire, which exits the last AP− slot after the last turn is connected to neutral point 19. The first end is connected to terminal 14. The other two phases can be wound similarly and connected to neutral point 19 and corresponding terminals 16 and 18. Accordingly, as is shown in FIG. 2A, the first 6 slots are for the "positive polarity" of phase A, the next 6 slots are for the "negative polarity" of phase C, the next 6 slots are for the "positive polarity" of phase B, the next 6 slots are for the "negative polarity" of phase A, the next 6 slots are the "positive polarity" of phase C, and the final 6 slots are for the "negative polarity" of phase B.

Similarly, secondary core 32 is shown in FIG. 2B and comprises a number of slots which may be greater than, equal to, or less than the number of slots in primary core 31. As shown in FIG. 2B, however, the number of slots for the secondary core 32 is equal to the number of slots for primary core 31 shown in FIG. 2A. As shown in FIG. 2B, the first 6 slots are for the "positive polarity" of phase A, the next 6 slots are for the "negative polarity" of phase C, the next 6 slots are for the "positive polarity" of phase B, the next 6 slots are for the "negative polarity" of phase A, the next 6 slots are for the "positive polarity" of phase C, and the final 6 slots are for the "negative polarity" of phase B.

In winding phase A in FIG. 2B, insulated conducting wire can be started in the first AS+slot, wound to the opposite AS− slot, and returned to the first AS+ slot for the desired number of turns for the first set of oppositely-disposed slots and then advanced to the next pair of oppositely disposed AS+ and AS− slots for the desired number of turns, and so on, until all 6 pairs of oppositely disposed AS+ and AS− slots have the desired number of turns. The starting end of the conducting wire is connected to terminal 22 and the final end is connected to neutral point 27. The phase B slots and phase C slots may be similarly wound until the desired number of turns is provided for each phase of each of the secondary windings of the transformer and the B and C windings can be similarly connected to neutral point 27 and to corresponding terminals 24 and 26.

Figure 3A:
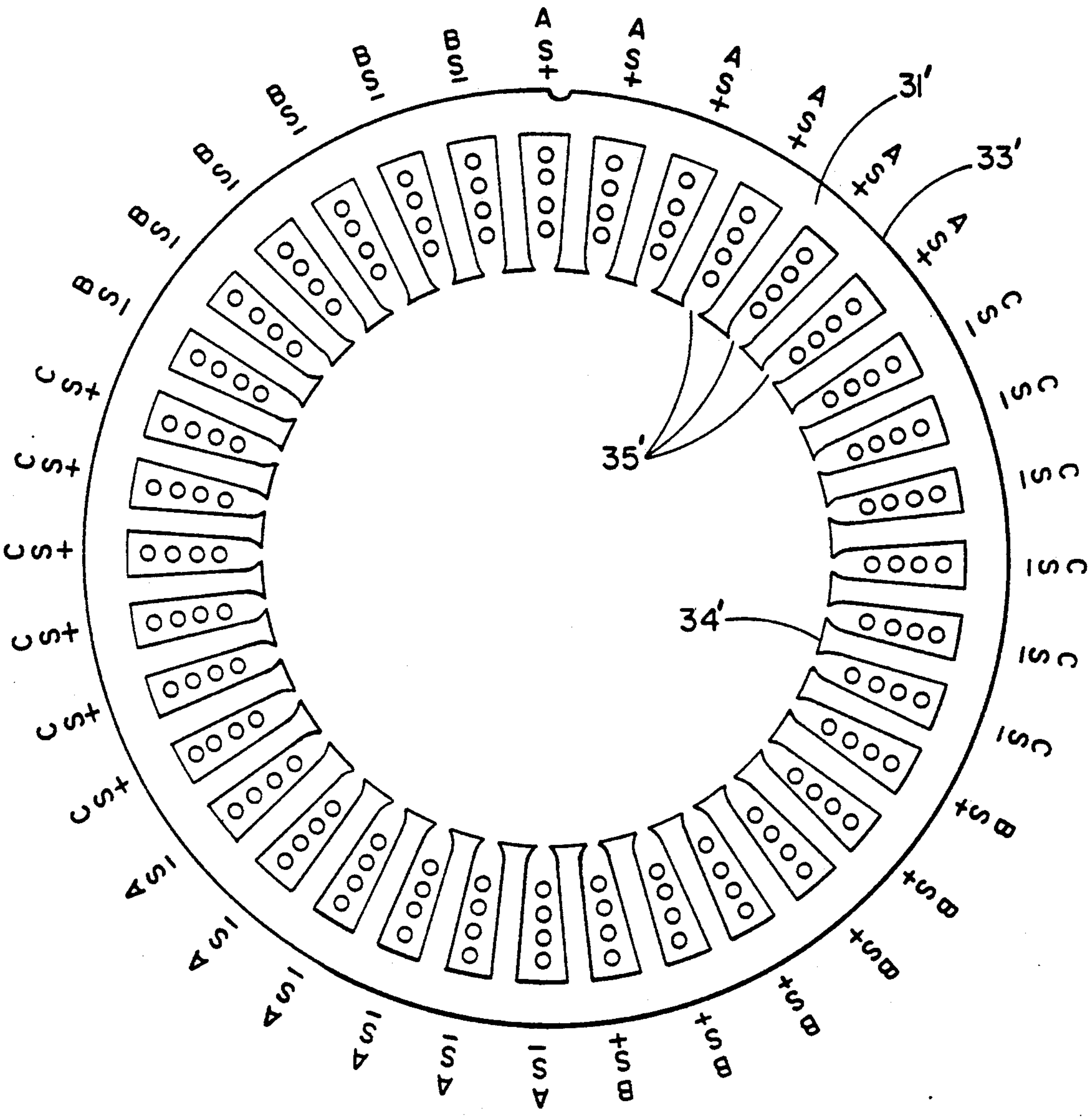
FIGS. 3A and 3B show an alternative embodiment in which the secondary windings are wound on the outer core and the primary windings are wound on the inner core.
Figure 3B:
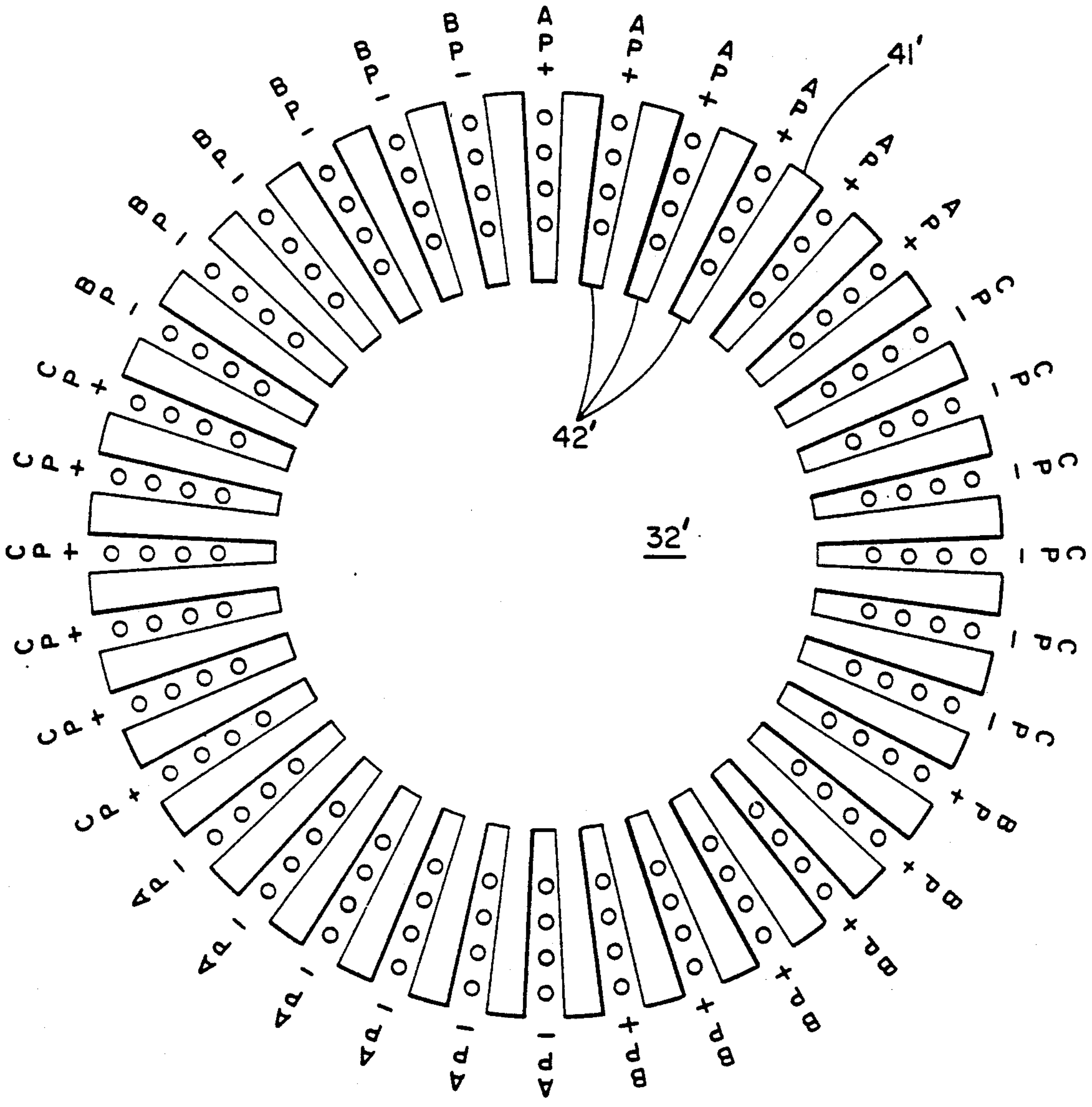

The transformer shown in FIGS. 3A and 3B is similar to the transformer shown in FIGS. 2A and 2B. However, whereas in FIGS. 2A and 2B, the primary is wound within the slots disposed along the inner periphery of outer core 31 and the secondary is wound in the slots disposed along the outer periphery of inner core 32, in FIGS. 3A and 3B, the secondary is wound in the slots disposed around the inner periphery of outer core 31′ and the primary is wound in the slots disposed around the outer periphery of inner core 32′. In either of the embodiments shown in FIGS. 2A and 2B, or in FIGS. 3A and 3B, once the windings have been wound in the slots as shown, the outer core can be heated and thereby expanded and the inner core can be placed within the outer core such that the outer periphery 41 of the inner core is within the inner periphery 34 of the outer core. As the outer core cools, it will shrink, providing a snug fit between inner core 32 and outer core 31 which will reduce acoustic noise caused by the cores vibrating against one another when the transformer is energized.

Figure 4:
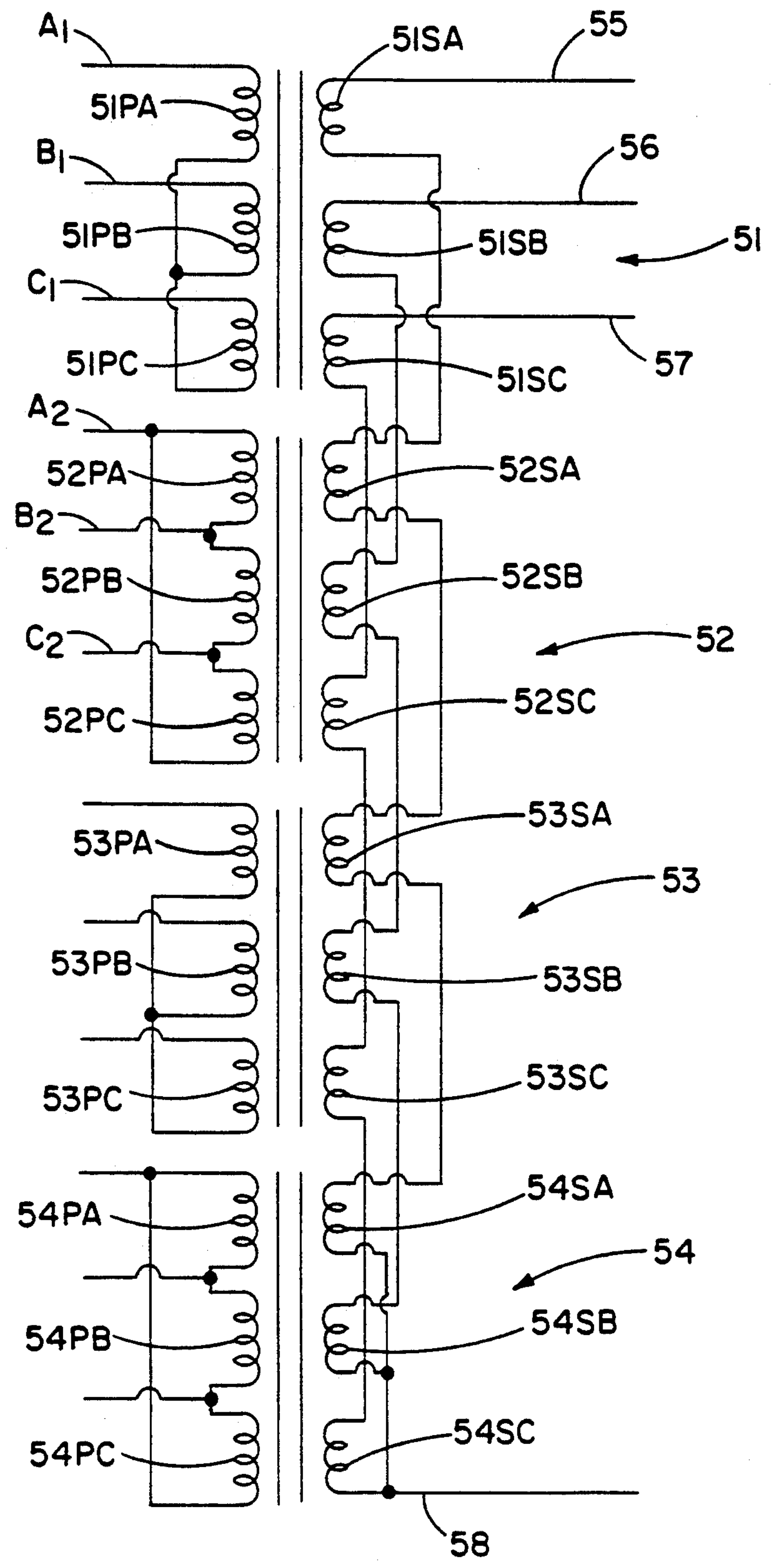
FIG. 4 shows the three-phase winding connections of four transformers which can be used as a summing transformer.

In order to form a summing transformer, two or more of the transformers shown in FIGS. 1, 2A, 2B, 3A, and 3B are shown electrically connected in FIG. 4. Specifically, FIG. 4 shows four three-phase transformers 51, 52, 53, and 54 connected so that corresponding phases induced in the secondaries of each of the transformers are summed.

Accordingly, transformer 51 has first primary winding 51PA having one end connected to receive phase A voltage, primary winding 51PB having one end connected to receive phase B voltage, and third primary winding 51PC having one end connected to receive phase C voltage. The other ends of each of the windings are connected together. Transformer 51 also has three secondary windings 51SA, 51SB, and 51SC. FIG. 4 shows that the primary windings of transformer 51 are wye connected.

Second transformer 52 has first primary winding 52PA having one end connected to receive phase A voltage and one end connected to receive phase B voltage, second primary winding 52PB having one end connected to receive phase B voltage and one end connected to receive phase C voltage, and third primary winding 52PC having one end connected to receive phase C voltage and one end connected to receive phase A voltage. These windings are delta connected. Transformer 52 also has secondary windings 52SA, 52SB, and 52SC.

Transformer 53 has first primary winding 53PA having one end connected to receive phase A voltage, primary winding 52PB having one end connected to receive phase B voltage, and third primary winding 53PC having one end connected to receive phase C voltage. The other ends of the three primary windings 53PA, 53PB, and 53PC are connected together to form a wye-connected primary. Transformer 53 also has secondary windings 53SA, 53SB, and 53SC.

Transformer 54 has first primary winding 54PA having one end connected to receive phase A voltage and one end connected to receive phase B voltage, second primary winding 54PB having one end connected to receive phase B voltage and one end connected to receive phase C voltage, and third primary winding 54PC having one end connected to receive phase C voltage and one end connected to receive phase A voltage. Thus, the primary windings of transformer 54 are delta connected. Transformer 54 has secondary windings 54SA, 54SB, and 54SC.

As shown in FIG. 4, secondary windings 51SA, 52SA, 53SA, and 54SA are connected in series between output line 55 and neutral line 58 in order to supply output phase A voltage. Similarly, secondary windings 51SB, 52SB, 53SB, and 54SB are connected in series between output line 56 and neutral line 58 in order to supply phase B voltage. Secondary windings 51SC, 52SC, 53SC, and 54SC are connected in series between output line 57 and neutral line 58 for supplying phase C voltage. Thus, the voltages induced in the four phase A secondary windings are added in order to produce the phase A output on line 55. The voltages induced in the four phase B secondaries are added to produce the phase B output voltage on line 56. The voltages induced in the four phase C secondaries are added in order to produce the output phase C voltages on output line 57.

Although the primary windings of transformer 51 and the primary windings of transformer 53 have been shown wye connected, and the primary windings of transformer 52 and the primary windings of transformer 54 have been shown delta connected, the primary windings of each of the transformers may be wye connected or they may be delta connected, or they may have any other combination of wye and delta connections.

An example of one use of the summing transformer arrangement shown according to the present invention is in an inverter system such as that shown in copending application Ser. No. 07/911,542 filed on Jul. 9, 1992.

Figure 5:
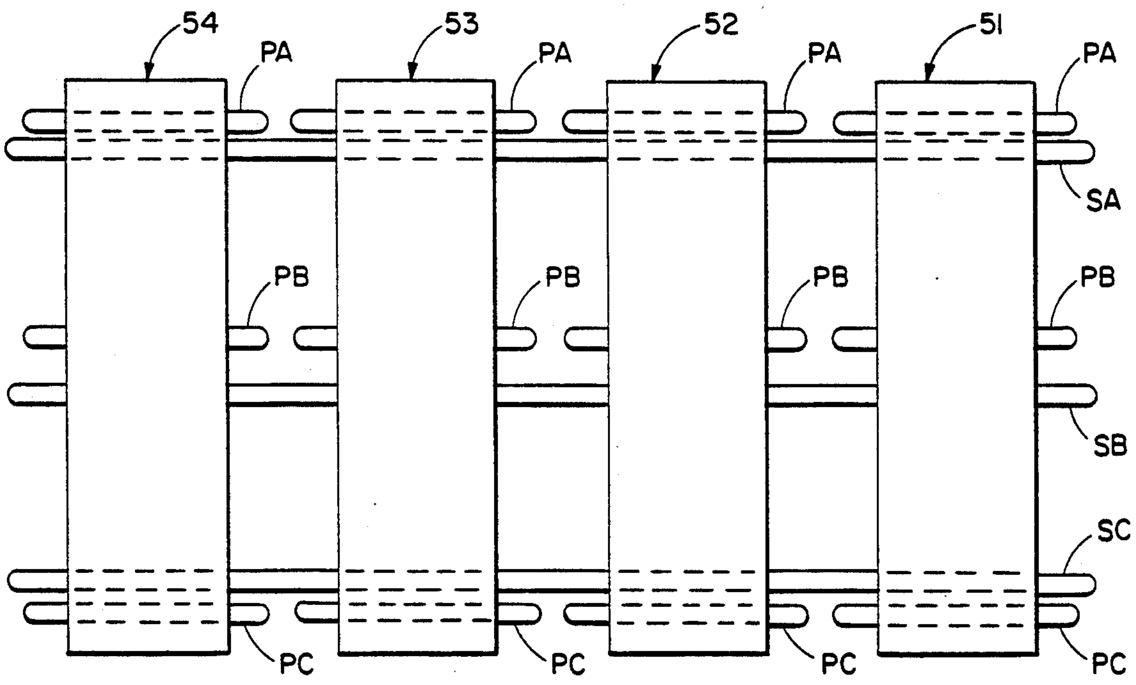
FIG. 5 shows the magnetic arrangement of the four transformers shown in FIG. 4.

The four transformers 51, 52, 53, and 54 are structurally shown in FIG. 5. Each transformer has its own core arrangement such as the inner and outer cores shown in FIGS. 2A and 2B or in FIGS. 3A and 3B. Each transformer has three primary inputs PA, PB, and PC, while common secondary interconnects SA, SB, and SC run between transformers.

The outer and inner cores may be formed of ring-shaped laminations. For example, outer ring 31 may comprise a series of rings having outer periphery or circumference 33 and inner periphery or circumference 34, such that each lamination is generally doughnut-shaped, with slots 35 disposed along the inner circumference or periphery 34. The series of doughnut-shaped rings can then be laminated together to form outer core 31. Similarly, inner core 41 can comprise a series of disks having outer periphery or circumference 41 with slots 42 disposed along the outer periphery or circumference 41. The disks can then be laminated together to form inner core 32. Although the cores have been shown circularly shaped, they can be of any desired geometric shape. Furthermore, it may be possible to use a single core for each of the transformers 51, 52, 53, and 54 instead of the inner and outer core approach shown herein. In that case, each set of primaries and secondaries would be wound on a corresponding core. Additionally, a single core structure can be provided for all four transformers such that all 12 primary windings and all 12 secondary windings can be wound on the same core structure. Other variations can be made without departing from the scope of the invention as defined in the following claims.

What is claimed is:

1. A rotating field summing transformer comprising:

first and second core means for providing a path for electromagnetic flux;

first primary winding means and first secondary winding means wound with respect to said first core means such that said first primary winding means and said first secondary winding means form a transformer for producing a rotating electromagnetic field when said first primary winding means is energized which induces a first secondary output in said first secondary winding means, said first primary winding means and said first secondary winding means being stationary with respect to one another;

second primary winding means and second secondary winding means wound with respect to said second core means such that said second primary winding means and said second secondary winding means form a transformer for producing a rotating electromagnetic field when said second primary winding means is energized which induces a second secondary output in said second secondary winding means, said second primary winding means and said second secondary winding means being stationary with respect to one another; and, connecting means for connecting said first and second secondary winding means together so that said first and second secondary outputs add.

2. The summing transformer of claim 1 wherein said first core means comprises first slots for receiving said first primary winding means and said first secondary winding means and said second core means comprises second slots for receiving said second primary winding means and said second secondary winding means.

3. The summing transformer of claim 2 wherein said first primary winding means comprises a plurality of first primary windings and said first secondary winding means comprises a plurality of first secondary windings, said first primary windings and said first secondary windings being wound in said first slots such that a first rotating electromagnetic field is established in said first core means when said first primary windings are energized, said first rotating electromagnetic field inducing said first secondary output in said first secondary windings, and wherein said second primary winding means comprises a plurality of second primary windings and said second secondary winding means comprises a plurality of second secondary windings, said second primary windings and said second secondary windings being wound in said second slots such that a second rotating electromagnetic field is established in said second core means when said second primary windings are energized, said second rotating electromagnetic field inducing said second secondary output in said second secondary windings, said connecting means adding said first and second secondary outputs.

4. The summing transformer of claim 3 wherein said first core means comprises a first core having an outer and an inner periphery with at least some of said first slots being disposed around said inner periphery of said first core and wherein said first core means further comprises a second core having an outer periphery with at least some of said first slots being disposed around said outer periphery of said second core such that said second core, when inserted within said inner periphery of said first core, will fit snugly within said first core, said first primary windings being wound in said slots of said first core and said first secondary windings being wound in said slots of said second core.

5. The summing transformer of claim 4 wherein said second core means comprises a third core having an outer and an inner periphery with at least some of said second slots being disposed around said inner periphery of said third core and wherein said second core means further comprises a fourth core having an outer periphery with at least some of said second slots being disposed around said outer periphery of said fourth core such that said fourth core, when inserted within said inner periphery of said third core, will fit snugly within said third core, said second primary windings being wound in said slots of said third core and said second secondary windings being wound in said slots of said fourth core.

6. The summing transformer of claim 3 wherein said first core means comprises a first core having an outer periphery with at least some of said first slots being disposed around said outer periphery of said first core and wherein said first core means further comprises a second core having an outer and an inner periphery with at least some of said first slots being disposed around said inner periphery of said second core such that said first core, when inserted within said inner periphery of said second core, will fit snugly within said second core, said first primary windings being wound in said slots of said first core and said first secondary windings being wound in said slots of said second core.

7. The summing transformer of claim 6 wherein said second core means comprises a third core having an outer periphery with at least some of said second slots being disposed around said outer periphery of said third core and wherein said second core means further comprises a fourth core having an outer and an inner periphery with at least some of said second slots being disposed around said inner periphery of said fourth core such that said third core, when inserted within said inner periphery of said fourth core, will fit snugly within said fourth core, said second primary windings being wound in said slots of said third core and said second secondary windings being wound in said slots of said fourth core.

8. The summing transformer of claim 1 wherein said first primary winding means comprises a first phase first primary winding, a second phase first primary winding, and a third phase first primary winding, wherein said first secondary winding means comprises a first phase first secondary winding, a second phase first secondary winding, and a third phase first secondary winding, wherein said second primary winding means comprises a first phase second primary winding, a second phase second primary winding, and a third phase second primary winding, wherein said second secondary winding means comprises a first phase second secondary winding, a second phase second secondary winding, and a third phase second secondary winding, and wherein said connecting means comprises first connecting means connecting said first phase first secondary winding to said first phase second secondary winding so that signals induced on said first phase first and second secondary windings will add to form a first phase transformer output, second connecting means connecting said second phase first secondary winding to said second phase second secondary winding so that signals induced on said second phase first and second secondary windings will add to form a second phase transformer output, and third connecting means connecting said third phase first secondary winding to said third phase second secondary winding so that signals induced on said third phase first and second secondary windings will add to form a third phase transformer output.

9. The summing transformer of claim 8 wherein said first core means comprises first slots for receiving said first, second, and third phase first primary windings, and second slots for receiving said first, second, and third phase first secondary windings, and wherein said second core means comprises third slots for receiving said first, second, and third phase second primary windings, and fourth slots for receiving said first, second, and third phase second secondary windings.

10. The summing transformer of claim 9 wherein said first, second, and third phase first primary windings are situated within said first slots with said first phase first primary winding, said second phase first primary winding and said third phase first primary winding being geometrically displaced with respect to each other such that a rotating electromagnetic field is established in said first core means when said first, second, and third phase first primary windings are energized, said first rotating electromagnetic field inducing first, second, and third phase first secondary outputs in said corresponding first, second, and third phase first secondary windings, and wherein said first, second, and third phase second primary windings are situated within said third slots with said first phase second primary winding, said second phase second primary winding and said third phase second primary winding being geometrically displaced with respect to each other such that a rotating electromagnetic field is established in said second core means when said first, second and third phase second primary windings are energized, said rotating electromagnetic field inducing first, second and third phase second secondary outputs in said corresponding first, second and third phase second secondary windings.

11. The summing transformer of claim 10 wherein said first core means comprises a first core having an outer and an inner periphery with said first slots being disposed around said inner periphery of said first core, wherein said first core means further comprises a second core having an outer periphery with said second slots being disposed around said outer periphery of said second core such that said second core, when inserted within said inner periphery of said first core, will fit snugly within said first core, said first, second, and third phase first secondary windings being wound in said second slots such that said first phase first secondary winding, said second phase first secondary winding and said third phase first secondary winding are geometrically displaced with respect to each other with said first phase first primary winding being in close proximity with said first phase first secondary winding, said second phase first primary winding being in close proximity with said second phase first secondary winding, and said third phase first primary winding being in close proximity with said third phase first secondary winding.

12. The summing transformer of claim 11 wherein said second core means comprises a third core having an outer and an inner periphery with said third slots being disposed around said inner periphery of said third core, and wherein said second core means further comprises a fourth core having an outer periphery with said fourth slots being disposed around said outer periphery of said fourth core such that said fourth core, when inserted within said inner periphery of said third core, will fit snugly within said third core, said first, second, and third phase second secondary windings being wound in said fourth slots of said fourth core such that said first phase second secondary winding, said second phase second secondary winding and said third phase second secondary winding are geometrically displaced with respect to each other and with said first phase second primary winding being in close proximity with said first phase second secondary winding, said second phase second primary winding being in close proximity with said second phase second secondary winding, and said third phase second primary winding being in close proximity with said third phase second secondary winding.

13. The summing transformer of claim 10 wherein said first core means comprises a first core having an outer periphery with said first slots being disposed around said outer periphery of said first core, and wherein said first core means further comprises a second core having an outer and an inner periphery with said second slots being disposed around said inner periphery of said second core such that said first core, when inserted within said inner periphery of said second core, will fit snugly within said second core, said first, second, and third phase first secondary windings being wound in said second slots of said second core such that said said first phase first secondary winding, said second phase first secondary winding and said third phase first secondary winding are geometrically displaced with respect to each other with said first phase first primary winding being in close proximity with said first phase first secondary winding, said second phase first primary winding being in close proximity with said second phase first secondary winding, and said third phase first primary winding being in close proximity with said third phase first secondary winding.

14. The summing transformer of claim 13 wherein said second core means comprises a third core having an outer periphery with said third slots being disposed around said outer periphery of said third core, and wherein said second core means further comprises a fourth core having an outer and an inner periphery with said fourth slots being disposed around said inner periphery of said fourth core such that said third core, when inserted within said inner periphery of said fourth core, will fit snugly within said fourth core, said first, second, and third phase second secondary windings being wound in said fourth slots of said fourth core such that said first phase second secondary winding, said second phase second secondary winding and said third phase second secondary winding are geometrically displaced with respect to each other and with said first phase second primary winding being in close proximity with said first phase second secondary winding, said second phase second primary winding being in close proximity with said second phase second secondary winding, and said third phase second primary winding being in close proximity with said third phase second secondary winding.

15. A transformer comprising:

first core means having an outer and an inner periphery;

second core means being disposed within said first core means and having an outer periphery substantially coextensive with said inner periphery of said first core means, said inner periphery of said first core means and said outer periphery of said second core means forming an interface between said first core means and said second core means;

slot means having slots disposed along said interface; and primary winding means and secondary winding means wound in said slots such that an input signal supplied to said primary winding means establishes an electromagnetic flux in said first and second core means to induce an output signal in said secondary winding means.

16. The transformer of claim 15 wherein said slot means comprises a first set of slots disposed around said inner periphery of said first core means and a second set of slots disposed around said outer periphery of said second core means, said primary winding means being wound in said first set of slots and said secondary windings means being wound in said second set of slots.

17. The transformer of claim 15 wherein said slot means comprises a first set of slots disposed around said inner periphery of said first core means and a second set of slots disposed around said outer periphery of said second core means, said primary winding means being wound in said second set of slots and said secondary windings means being wound in said first set of slots.

18. The transformer of claim 15 wherein said primary winding means comprises first, second and third primary windings each receiving a separate phase of a three-phase input signal and said secondary winding means comprises first, second and third secondary windings each providing a separate phase of a three-phase output signal.

19. The transformer of claim 18 wherein said slot means comprises a first set of slots disposed around said inner periphery of said first core means and a second set of slots disposed around said outer periphery of said second core means, said first, second and third primary windings being spatially wound in said first set of slots and said first, second and third secondary windings being spatially wound in said second set of slots such that an input signal supplied to said first, second and third primary windings produces a rotating electromagnetic field and induces three-phase secondary outputs in said secondary windings.

20. The transformer of claim 18 wherein said slot means comprises a first set of slots disposed around said inner periphery of said first core means and a second set of slots disposed around said outer periphery of said second core means, said first, second and third primary windings being spatially wound in said second set of slots and said first, second and third secondary windings being spatially wound in said first set of slots such that an input signal supplied to said first, second and third primary windings produces a rotating electromagnetic field and induces three-phase secondary outputs in said secondary windings.

21. A rotating field summing transformer comprising:

core means for providing a path for electromagnetic flux;

a first phase first primary winding, a second phase first primary winding, and a third phase first primary winding wound with respect to said core means so as to produce a rotating electromagnetic field when said first phase first primary winding, said second phase first primary winding, and said third phase first primary winding are energized;

a first phase second primary winding, a second phase second primary winding, and a third phase second primary winding wound with respect to said core means so as to produce a rotating electromagnetic field when said first phase second primary winding, said second phase second primary winding, and said third phase second primary winding are energized;

a first phase third primary winding, a second phase third primary winding, and a third phase third primary winding wound with respect to said core means so as to produce a rotating electromagnetic field when said first phase third primary winding, said second phase third primary winding, and said third phase third primary winding are energized;

a first phase first secondary winding, a second phase first secondary winding, and a third phase first secondary winding wound with respect to the core means so that secondary voltages are induced therein upon energization of the first phase first primary winding, the second phase first primary winding, and the third phase first primary winding;

a first phase second secondary winding, a second phase second secondary winding, and a third phase second secondary winding wound with respect to the core means so that secondary voltages are induced therein upon energization of the first phase second primary winding, the second phase second primary winding, and the third phase second primary winding;

a first phase third secondary winding, a second phase third secondary winding, and a third phase third secondary winding wound with respect to the core means so that secondary voltages are induced therein upon energization of the first phase third primary winding, the second phase third primary winding, and the third phase third primary winding;

first connecting means for connecting the first phase first secondary winding, the first phase second secondary winding, and the first phase third secondary winding so that secondary voltages induced therein add;

second connecting means for connecting the second phase first secondary winding, the second phase second secondary winding, and the second phase third secondary winding so that secondary voltages induced therein add; and, third connecting means for connecting the third phase first secondary winding, the third phase second secondary winding, and the third phase third secondary winding so that secondary voltages induced therein add.

* * * * *